(12) United States Patent  (10) Patent No.: US 10,770,982 B2
Kikuchi  (45) Date of Patent: Sep. 8, 2020

(54) ISOLATED SYNCHRONOUS RECTIFYING DC/DC CONVERTER

(71) Applicant: ROHM CO., LTD., Kyoto (JP)

(72) Inventor: Hiroki Kikuchi, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 16/189,243

(22) Filed: Nov. 13, 2018

(65) Prior Publication Data
US 2019/0222132 A1  Jul. 18, 2019

(30) Foreign Application Priority Data

Jan. 17, 2018  (JP) ................................. 2018-005618

(51) Int. Cl.
 *H02M 3/335* (2006.01)
 *H02M 3/158* (2006.01)
 (Continued)

(52) U.S. Cl.
 CPC ......... *H02M 3/33592* (2013.01); *H02M 1/08* (2013.01); *H02M 1/32* (2013.01);
 (Continued)

(58) Field of Classification Search
 CPC . H02M 2001/0003; H02M 2001/0009; H02M 2001/0029; H02M 2001/0032;
 (Continued)

(56) References Cited

U.S. PATENT DOCUMENTS

2005/0122753 A1* 6/2005 Soldano ............ H02M 3/33592
 363/125
2005/0248964 A1* 11/2005 Dalal ................ H02M 3/33592
 363/21.08
(Continued)

FOREIGN PATENT DOCUMENTS

CN 105322813 A 2/2016
JP 2009159721 A 7/2009

OTHER PUBLICATIONS

CNIPA First Office Action for corresponding CN Application No. 201910031504.2, dated Jun. 29, 2020.

*Primary Examiner* — Jue Zhang
*Assistant Examiner* — David A. Singh
(74) *Attorney, Agent, or Firm* — Cantor Colburn LLP

(57) ABSTRACT

An isolated synchronous rectifying DC/DC converter includes a drain terminal connected to a drain of a synchronous rectification transistor, a source terminal connected to a source of the synchronous rectification transistor; a comparator configured to compare a drain voltage of the drain terminal with a predetermined threshold voltage which set is based on a potential of the source terminal, a first flip-flop to which an OFF signal output from the comparator is input, a driver configured to output a gate signal to the synchronous rectification transistor based on an output signal of the first flip-flop, and a first abnormality detection circuit including an abnormality detection comparator configured to compare a voltage of the source terminal with a detection threshold voltage, and configured to output a first abnormality detection signal based on an output of the abnormality detection comparator.

11 Claims, 7 Drawing Sheets

(51) Int. Cl.
*H02M 1/32* (2007.01)
*H02M 1/08* (2006.01)
*H02M 1/00* (2006.01)

(52) U.S. Cl.
CPC ...... *H02M 3/1588* (2013.01); *H02M 3/33523* (2013.01); *H02M 2001/0003* (2013.01); *H02M 2001/0009* (2013.01); *H02M 2001/0038* (2013.01); *H02M 2001/0048* (2013.01); *H02M 2001/0054* (2013.01)

(58) Field of Classification Search
CPC . H02M 2001/0038; H02M 2001/0048; H02M 2001/0054; H02M 1/08; H02M 1/32; H02M 1/325; H02M 1/327; H02M 1/36; H02M 3/00; H02M 3/158; H02M 3/1588; H02M 3/22; H02M 3/24; H02M 3/28; H02M 3/325; Y02B 70/1458; Y02B 70/1475
USPC .... 363/15–21.18, 37, 38, 40–48, 50–58, 84, 363/86, 88, 89, 95–99, 106, 108, 109, 363/114, 115, 123–134, 146, 147; 323/205–211, 222–226, 271–278, 323/282–288, 294, 297, 298, 318, 323/351–354, 902, 907, 908, 909; 361/18, 78–92, 93.1, 93.7, 93.8, 94–101, 361/103, 106
See application file for complete search history.

(56) References Cited

U.S. PATENT DOCUMENTS

| | | | |
|---|---|---|---|
| 2007/0201253 A1* | 8/2007 | Endo | H02M 1/083 363/127 |
| 2009/0273951 A1* | 11/2009 | Ren | H02M 3/33592 363/21.06 |
| 2010/0027298 A1* | 2/2010 | Cohen | H02M 3/33592 363/21.14 |
| 2014/0192565 A1* | 7/2014 | Wang | H02M 3/33592 363/21.14 |
| 2015/0280584 A1* | 10/2015 | Gong | H02M 3/33515 363/21.13 |
| 2016/0006369 A1 | 1/2016 | Zoescher | |
| 2016/0036340 A1* | 2/2016 | Kikuchi | H02M 1/32 363/21.14 |
| 2016/0072399 A1* | 3/2016 | Kikuchi | H02M 3/33592 363/21.14 |
| 2016/0190942 A1* | 6/2016 | Kikuchi | H02M 3/33507 363/21.14 |
| 2016/0261204 A1* | 9/2016 | Kikuchi | H02M 3/33523 |
| 2017/0279363 A1* | 9/2017 | Hagino | H02M 3/33523 |
| 2018/0006569 A1* | 1/2018 | Kikuchi | H02M 3/33592 |

* cited by examiner

ISOLATED SYNCHRONOUS RECTIFYING DC/DC CONVERTER

CROSS-REFERENCE TO RELATED APPLICATION(S)

The present application claims priority under 35 U.S.C. § 119(e) to Japanese Patent Application No. 2018-005618, filed on Jan. 17, 2018, the entire contents of which are incorporated herein by reference.

TECHNICAL FIELD

The present disclosure relates to an isolated synchronous rectifying DC/DC converter.

BACKGROUND

An isolated synchronous rectifying DC/DC converter is utilized for various power source circuits including an AC/DC converter.

FIG. 7 is a circuit diagram illustrating an example of a partial configuration on a secondary side of an isolated synchronous rectifying DC/DC converter. The configuration on the secondary side illustrated in FIG. 7 is common to a flyback converter and an LLC converter.

A secondary winding W200 illustrated in FIG. 7 is included in a transformer Tr. A primary side (not shown) of the isolated synchronous rectifying DC/DC converter includes a primary winding of the transformer Tr, a switching transistor, a primary side controller for driving the switching transistor, and the like.

One end of the secondary winding W200 is connected to an output terminal (not shown), and the other end thereof is connected to a drain of a synchronous rectification transistor M200. A source of the synchronous rectification transistor M200 is connected to a ground application terminal.

The isolated synchronous rectifying DC/DC converter includes a synchronous rectification controller 300S on the secondary side. The synchronous rectification controller 300S has a gate terminal G10, a drain terminal D10, a source terminal S10, and a ground terminal GND as external terminals. A gate of the synchronous rectification transistor M200 is connected to the gate terminal G10. The drain of the synchronous rectification transistor M200 is connected to the drain terminal D10. The source of the synchronous rectification transistor M200 is connected to the source terminal S10. The ground application terminal is connected to the ground terminal GND.

The synchronous rectification controller 300S outputs a gate signal GS from the gate terminal G10 based on a drain voltage VDS2 generated at the drain terminal D10 to control switching of the synchronous rectification transistor M200. By the switching of the switching transistor on the primary side and the switching of the synchronous rectification transistor M200, an input voltage applied to the primary winding is converted to an output voltage and outputted from the output terminal.

Specifically, the synchronous rectification controller 300S includes a driver Dr1, a first comparator CP1, a second comparator CP2, a flip-flop FF1, a first diode D1, and a second diode D2.

The drain terminal D10 is connected to an inverting input terminal (−) of the first comparator CP1. A first threshold voltage VthA is applied to a non-inverting input terminal (+) of the first comparator CP1. An output terminal of the first comparator CP1 is connected to a clock terminal of the flip-flop FF1. The drain terminal D10 is connected to an inverting input terminal (−) of the second comparator CP2. A second threshold voltage VthB is applied to a non-inverting input terminal (+) of the second comparator CP2. An output terminal of the second comparator CP2 is connected to a reset terminal of the flip-flop FF1. A predetermined power supply voltage is applied to a D input terminal of the flip-flop FF1. A Q output terminal of the flip-flop FF1 is connected to an input terminal of the driver Dr1. An output terminal of the driver Dr1 is connected to the gate terminal G10. A low potential side of the driver Dr1 is connected to the source terminal S10.

The first threshold voltage VthA and the second threshold voltage VthB are set based on a potential of the source terminal S10. A negative voltage is generated in the drain voltage VDS2 by the switching of the switching transistor on the primary side, and the first comparator CP1 detects that the drain voltage VDS2 becomes equal to or lower than the first threshold voltage VthA (e.g., −200 mV), and asserts an ON signal Son. Accordingly, the flip-flop FF1 sets a signal of the output terminal Q to a High level, the gate signal GS output from the driver Dr1 becomes an ON level, and the synchronous rectification transistor M200 is turned on.

When the synchronous rectification transistor M200 is turned on, a current Is starts to flow from the source to the drain of the synchronous rectification transistor M200. The drain voltage VDS2 is generated by the current Is and on-resistance of the synchronous rectification transistor M200, and the second comparator CP2 detects zero current at which the current Is becomes substantially zero based on the drain voltage VDS2. Specifically, when the second comparator CP2 detects that the drain voltage VDS2 becomes equal to or higher than the second threshold voltage VthB (e.g., −6 mV), an OFF signal Soff is asserted. Accordingly, the flip-flop FF1 is reset, the signal of the Q output terminal is set to a Low level, the gate signal GS output from the driver Dr1 becomes an OFF level, and the synchronous rectification transistor M200 is turned off.

Here, if the second threshold voltage VthB of the second comparator CP2 is set based on a ground, the detection by the second comparator CP2 is affected by parasitic impedance R1 between the ground and the source of the synchronous rectification transistor M200. Therefore, by setting the second threshold voltage VthB based on the potential of the source terminal S10, the drain voltage VDS2, which is set based on the source that is not affected by the impedance R1, can be used for detection of the second comparator CP2. Thus, it is possible to accurately detect the timing of turning off the synchronous rectification transistor M200.

In addition, the first diode D1 and the second diode D2, which are connected in parallel in opposite directions to each other, are arranged between the source terminal S10 and the ground terminal GND. Thus, when the source terminal S10 and the source of the synchronous rectification transistor M200 are opened (source open), i.e., when an abnormality occurs, assuming that a forward voltage of the first diode D1 is Vf1 and a forward voltage of the second diode D2 is Vf2, the voltage of the source terminal S10 is clamped in a voltage of not less than −Vf1 and not more than +Vf2, thereby preventing it from being unstable.

However, in the configuration illustrated in FIG. 7, when a source open occurs, there may be a case where the threshold voltage applied to the non-inverting input terminal of the second comparator CP2 becomes Vf2+VthB. For example, when Vf2 is +0.6 V and VthB is −6 mA, Vf2+VthB becomes a positive voltage which is approximately +0.6 V.

Then, the second comparator CP2 cannot assert an OFF signal Soff unless the drain voltage VDS2, which is set based on the current Is flowing when the synchronous rectification transistor M200 is turned on, is equal to or higher than a predetermined positive voltage (e.g., +0.6 V). Therefore, after the current Is flowing from the source to the drain of the synchronous rectification transistor M200 flows backward, an OFF signal Soff is asserted and the synchronous rectification transistor M200 is turned off. At this time, since the energy stored in the secondary winding W200 is applied to the synchronous rectification transistor M200, there may be a concern that an avalanche breakdown in which a large current flows through the synchronous rectification transistor M200 occurs and the synchronous rectification transistor M200 is destroyed.

Even when the source terminal S10 and the ground terminal GND are not connected by a diode, if the voltage of the source terminal S10 is unstable and becomes a positive voltage when a source open occurs, the threshold voltage applied to the non-inverting input terminal of the second comparator CP2 becomes a positive voltage, which causes the problem as described above.

SUMMARY

Some embodiments of the present disclosure provide an isolated synchronous rectifying DC/DC converter capable of detecting an abnormality of source open of a source terminal of a synchronous rectification controller.

According to one embodiment of the present disclosure, there is provided a configuration that includes a synchronous rectification transistor disposed on a secondary side of the DC/DC converter, and a synchronous rectification controller configured to control driving of the synchronous rectification transistor, wherein the synchronous rectification controller includes a drain terminal connected to a drain of the synchronous rectification transistor, a source terminal connected to a source of the synchronous rectification transistor, a comparator configured to compare a drain voltage of the drain terminal with a predetermined threshold voltage which is set based on a potential of the source terminal, a first flip-flop to which an OFF signal output from the comparator is input, a driver configured to output a gate signal to the synchronous rectification transistor based on an output signal of the first flip-flop, and a first abnormality detection circuit including an abnormality detection comparator configured to compare a voltage of the source terminal with a detection threshold voltage, and configured to output a first abnormality detection signal based on an output of the abnormality detection comparator (first configuration).

In the first configuration, the synchronous rectification controller may further include an AND circuit configured to receive the output signal of the first flip-flop and the first abnormality detection signal to output an output signal to the driver (second configuration).

In the second configuration, the first abnormality detection circuit may further include a second flip-flop to which an output of the abnormality detection comparator is input, and an inverter configured to receive an output of the second flip-flop to output the first abnormality detection signal (third configuration).

In the first configuration, the synchronous rectification controller may further include an abnormality output terminal as an external terminal, and the first abnormality detection circuit may be configured to output the first abnormality detection signal via the abnormality output terminal based on an output of the abnormality detection comparator (fourth configuration).

In any one of the first to the fourth configurations, the synchronous rectification controller may further include a ground terminal, and diodes connected in parallel in reverse directions to each other between the source terminal and the ground terminal (fifth configuration).

In any one of the first to the fourth configurations, the synchronous rectification controller may further include a ground terminal, and the source terminal and the ground terminal may be disconnected inside the synchronous rectification controller (sixth configuration).

In any one of the first to the sixth configurations, the abnormality detection comparator may be configured to assert an output signal when a state in which a voltage of the source terminal exceeds the detection threshold voltage continues for a predetermined period of time (seventh configuration).

In any one of the first to the seventh configurations, the synchronous rectification controller may further include a second abnormality detection circuit configured to stop switching of a switching transistor arranged on a primary side of the DC/DC converter by a primary side controller by asserting a second abnormality detection signal when an open of the drain terminal is detected (eighth configuration).

In the eighth configuration, the second abnormality detection circuit may be configured to assert the second abnormality detection signal when a periodic signal is not generated at the drain terminal and an output voltage of the isolated synchronous rectifying DC/DC converter is generated (ninth configuration).

In the eighth or the ninth configuration, a photocoupler and a feedback circuit configured to generate a feedback signal to the primary side controller by driving a light emitting element of the photocoupler based on the output voltage of the isolated synchronous rectifying DC/DC converter may be further included, and the synchronous rectification controller may further include a transistor connected to the light emitting element and configured to be driven by the second abnormality detection signal (tenth configuration).

In any one of the first to the tenth configurations, the DC/DC converter may be configured as an LLC converter having a first synchronous rectification transistor and a second synchronous rectification transistor, and the synchronous rectification controller may further include: a first drain terminal connected to a drain of the first synchronous rectification transistor; a second drain terminal connected to a drain of the second synchronous rectification transistor; a first source terminal connected to a source of the first synchronous rectification transistor; a second source terminal connected to a source of the second synchronous rectification transistor; a first gate terminal connected to a gate of the first synchronous rectification transistor; a second gate terminal connected to a gate of the second synchronous rectification transistor; a first driver configured to output a gate signal from the first gate terminal; a second driver configured to output a gate signal from the second gate terminal; a frequency divider to which an output signal of the first flip-flop is input; and a selector configured to switch a path of the comparator between the first drain terminal and the second drain terminal based on an output of the frequency divider, and to switch a path of the first flip-flop between the first driver and the second driver, wherein the predetermined threshold voltage may be set based on potentials of the first source terminal and the second source terminal, and wherein the abnormality detection comparator may be configured to compare a higher one of a voltage of the first source terminal and a voltage of the second source terminal, with the detection threshold voltage (eleventh configuration).

In the eleventh configuration, the synchronous rectification controller may further include an AND circuit configured to receive an output signal of the first flip-flop and the first abnormality detection signal to output an output signal to the selector.

DETAILED DESCRIPTION

Embodiments of the present disclosure will be now described in detail with reference to the drawings.

<1. First Embodiment>
<<Overall Configuration of the LLC Converter>>

Figure 1:
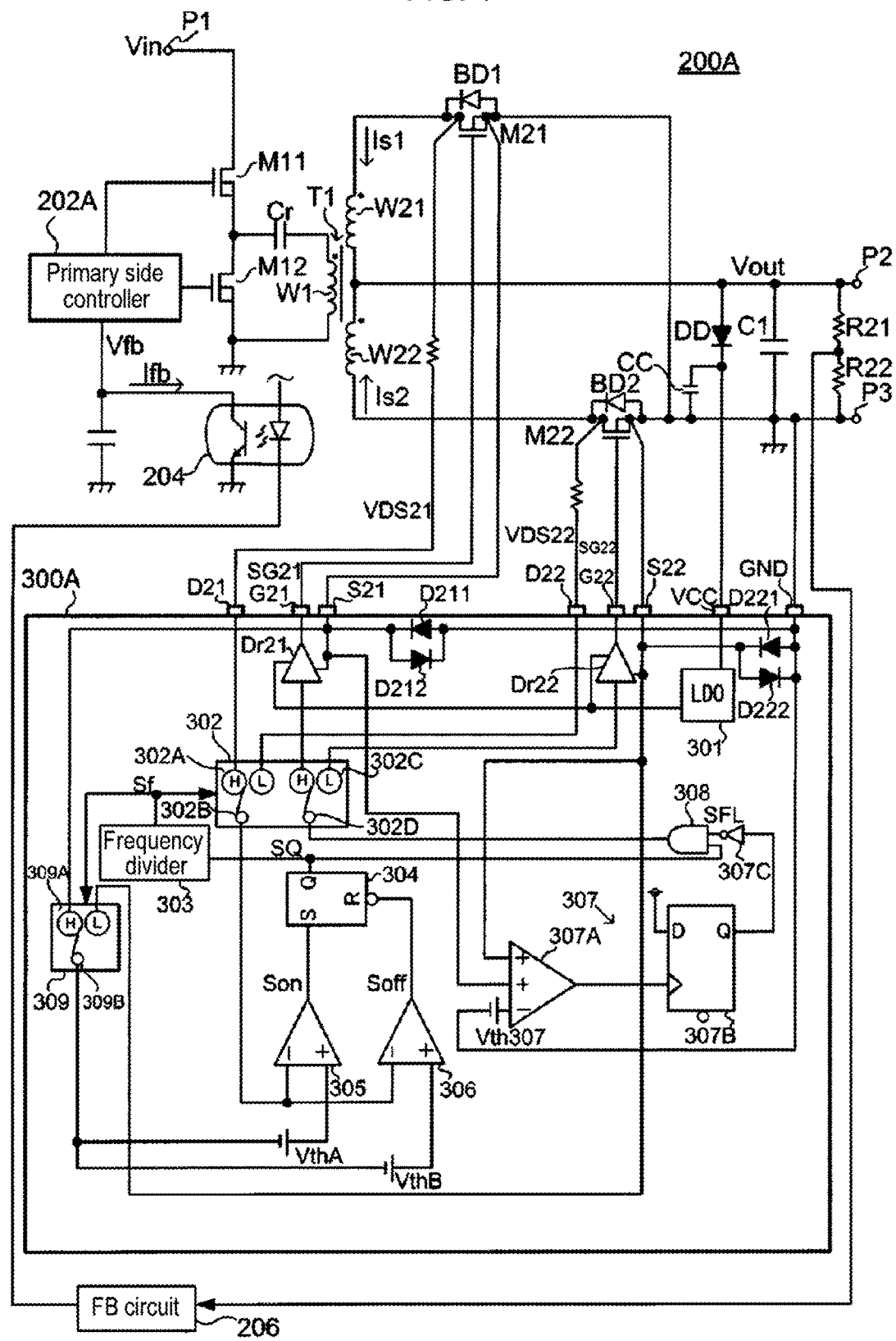
FIG. 1 is a circuit diagram of a DC/DC converter according to a first embodiment of the present disclosure.

FIG. 1 is a circuit diagram of a DC/DC converter 200A according to a first embodiment of the present disclosure. The DC/DC converter 200A is an isolated synchronous rectifying DC/DC converter as an LLC converter. The DC/DC converter 200A generates an output voltage Vout based on an input voltage Vin applied to an input terminal P1 and outputs it from an output terminal P2.

The DC/DC converter 200A includes switching transistors M11 and M12, a primary side controller 202A, a resonant capacitor Cr and a primary winding W1 of a transformer T1 as a primary side configuration, and secondary windings W21 and W22 of the transformer T1, synchronous rectification transistors M21 and M22, an output capacitor C1, resistors R21 and R22, a diode DD, a capacitor CC and a synchronous rectification controller 300A as a secondary side configuration.

A drain of the switching transistor M11 is connected to the input terminal P1 to which a DC input voltage Vin is applied. A source of the switching transistor M11 is connected to a drain of the switching transistor M12. A source of the switching transistor M12 is connected to a ground application terminal. One end of the resonant capacitor Cr is connected to a connection node to which the switching transistor M11 and the switching transistor M12 are connected. The other end of the resonance capacitor Cr is connected to one end of the primary winding W1. The other end of the primary winding W1 is connected to the source of the switching transistor M12.

The primary side controller 202A controls switching of the switching transistors M11 and M12 by outputting a driving signal to gates of the switching transistors M11 and M12.

One end of the secondary winding W21 is connected to a drain of the first synchronous rectification transistor M21. The first synchronous rectification transistor M21 has a body diode BD1. A source of the first synchronous rectification transistor M21 is connected to a ground terminal P3. The ground terminal P3 is connected to a ground application terminal.

The other end of the secondary winding W21 is connected to one end of the secondary winding W22. The other end of the secondary winding W22 is connected to a drain of the second synchronous rectification transistor M22. The second synchronous rectification transistor M22 has a body diode BD2. A source of the second synchronous rectification transistor M22 is connected to the ground terminal P3.

A connection node, to which the secondary winding W21 and the secondary winding W22 are connected, is connected to the output terminal P2. The output capacitor C1 is connected between the output terminal P2 and the ground terminal P3. The resistor R21 and the resistor R22 are connected in series between the output terminal P2 and the ground terminal P3. A feedback (FB) circuit 206 is connected to a connection node to which the resistors R21 and R22 are connected.

The FB circuit 206 has, for example, a shunt regulator and the like, and drives a light emitting element of a photocoupler 204 by a current corresponding to an error between a voltage obtained by dividing the output voltage Vout by the resistors R21 and R22 and a predetermined target voltage. A feedback current Ifb corresponding to the error flows through a light receiving element of the photocoupler 204. A feedback signal Vfb corresponding to the feedback current Ifb is generated at a feedback (FB) pin of the primary side controller 202A, and the primary side controller 202A drives the switching transistors M11 and M12 based on the feedback signal Vfb.

The synchronous rectification controller 300A has a low dropout (LDO) regulator 301, a selector 302, a frequency divider 303, a flip-flop 304, a first comparator 305, a second comparator 306, a source open abnormality detection circuit 307, an AND circuit 308, a selector 309, a first driver Dr21, a second driver Dr22, diodes D211 and D212, and diodes D221 and D222, in one package.

In addition, the synchronous rectification controller 300A includes a first drain terminal D21, a first gate terminal G21, a first source terminal S21, a second drain terminal D22, a second gate terminal G22, a second source terminal S22, a power terminal VCC, and a ground terminal GND for establishing electrical connection with the outside.

The first drain terminal D21, to which the drain of the first synchronous rectification transistor M21 is connected, is connected to one terminal of an input terminal 302A of the selector 302. The second drain terminal D22, to which the drain of the second synchronous rectification transistor M22 is connected, is connected to the other terminal of the input terminal 302A. An output terminal 302B of the selector 302 is connected to an inverting input terminal (−) of each of the first comparator 305 and the second comparator 306. The selector 302 switches between conduction of a path from the first drain terminal D21 to the output terminal 302B and conduction of a path from the second drain terminal D22 to the output terminal 302B. That is, the selector 302 selects one of a drain voltage VDS21 of the first drain terminal D21 and a drain voltage VDS22 of the second drain terminal D22 as a detection target of the first comparator 305 and the second comparator 306.

A first threshold voltage VthA is applied to a non-inverting input terminal (+) of the first comparator 305. An output terminal 309B of the selector 309 becomes a reference potential of the first threshold voltage VthA. One terminal of an input terminal 309A of the selector 309 is connected to the first source terminal S21 and the other terminal of the input terminal 309A is connected to the second source terminal S22. When the first source terminal S21 and the output terminal 309B are conducted by the selector 309, the first threshold voltage VthA is set based on a potential of the first source terminal S21, and when the second source terminal S22 and the output terminal 309B are conducted by the selector 309, the first threshold voltage VthA is set based on a potential of the second source terminal S22. An output terminal of the first comparator 305 is connected to a set terminal of the flip-flop 304. The first comparator 305 detects that the drain voltages VDS21 and VDS22 have dropped to a negative voltage by turning on the switching transistors M11 and M12 when the drain voltages VDS21 and VDS22 have become equal to or lower than the first threshold voltage VthA (e.g., −200 mV). At this time, the first comparator 305 asserts an ON signal Son. The first synchronous rectification transistor M21 and the second synchronous rectification transistor M22 are turned on by the asserted ON signal Son.

A second threshold voltage VthB is applied to a non-inverting input terminal (+) of the second comparator 306. A potential of the output terminal 309B of the selector 309 becomes a reference potential of the second threshold voltage VthB. When the first source terminal S21 and the output terminal 309B are conducted by the selector 309, a potential of the first source terminal S21 becomes a reference of the second threshold voltage VthB, and when the second source terminal S22 and the output terminal 309B are conducted by the selector 309, a potential of the second source terminal S22 becomes a reference of the second threshold voltage VthB. The output terminal of the second comparator 306 is connected to a reset terminal of the flip-flop 304. The second comparator 306 detects zero current at which currents Is1 and Is2 flowing by the first synchronous rectification transistor M21 and the second synchronous rectification transistor M22, which are turned on, become substantially zero when the drain voltages VDS21 and VDS22 have become equal to or higher than the second threshold voltage VthB (e.g., −6 mV). At this time, the second comparator 306 asserts an OFF signal Soff. The first synchronous rectification transistor M21 and the second synchronous rectification transistor M22 are turned off by the asserted OFF signal Soff.

Since the potential of the first source terminal S21 is the reference of the second threshold voltage VthB, the drain voltage VDS21 can be used for detection by using the source as a reference, which is not affected by parasitic impedance between the ground and the first synchronous rectification transistor M21 when the first synchronous rectification transistor M21 is turned on. Similarly, since the potential of the second source terminal S22 is the reference of the second threshold voltage VthB, the drain voltage VDS22 can be used for detection by using the source as a reference, which is not affected by parasitic impedance between the ground and the second synchronous rectification transistor M22 when the second synchronous rectification transistor M22 is turned on.

Figure 2:
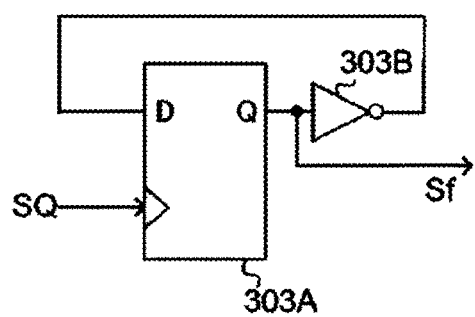
FIG. 2 is a circuit diagram illustrating one configuration example of a frequency divider.

A Q output terminal of the flip-flop 304 is connected to an input terminal of the AND circuit 308 as described hereinbelow together with the input terminal of the frequency divider 303. The frequency divider 303 has, for example, a configuration illustrated in FIG. 2, and includes a D flip-flop 303A and an inverter 303B. A Q output signal SQ from the flip-flop 304 is input to a clock terminal of the D flip-flop 303A. An input terminal of the inverter 303B is connected to the output terminal Q of the D flip-flop 303A. An output terminal of the inverter 303B is connected to an input terminal D of the D flip-flop 303A.

With this configuration, a frequency divider output signal Sf output from the output terminal Q of the D flip-flop 303A is switched between High and Low at every falling timing from H to Low of the Q output signal SQ. The frequency divider 303 outputs the frequency divider output signal Sf by doubling a cycle of the input Q output signal SQ.

The frequency divider output signal Sf is output to the selector 302. The selector 302 performs switching between the input terminal 302A and the output terminal 302B and between the input terminal 302D and the output terminal 302C according to a level of the frequency divider output signal Sf. An output terminal of the AND circuit 308, to which the Q output signal SQ is input, is connected to the input terminal 302D. One terminal of the output terminal 302C is connected to an input terminal of the first driver Dr21. An output terminal of the first driver Dr21 is connected to the gate of the first synchronous rectification transistor M21 via the first gate terminal G21. The first driver Dr21 outputs a gate signal SG21 whose level is switched according to a level of the input signal.

The other terminal of the output terminal 302C is connected to an input terminal of the second driver Dr22. An output terminal of the second driver Dr22 is connected to the gate of the second synchronous rectification transistor M22 via the second gate terminal G22. The second driver Dr22 outputs a gate signal SG22 whose level is switched according to the level of the input signal.

The conduction of a path from the output terminal of the AND circuit 308 to the first driver Dr21 and the conduction of a path from the output terminal of the AND circuit 308 to the second driver Dr22 are switched by the selector 302.

The frequency divider output signal Sf is also output to the selector 309. The selector 309 switches the conduction between the input terminal 309A and the output terminal 309B according to the level of the frequency divider output signal Sf.

An anode of the diode DD is connected to the output terminal P2. A cathode of the diode DD is connected to one end of the capacitor CC together with the power terminal VCC. The other end of the capacitor CC is connected to the ground terminal P3. The LDO regulator 301 generates and outputs an internal voltage based on the input voltage applied to the power terminal VCC. A portion of the internal voltage is supplied to high potential sides of the first driver Dr21 and the second driver Dr22. A low potential side of the first driver Dr21 is connected to the first source terminal S21. A low potential side of the second driver Dr22 is connected to the second source terminal S22.

In addition, the diodes D211 and D212 connected in parallel in reverse directions to each other are connected between the first source terminal S21 and the ground terminal GND. Accordingly, even when an abnormality in which a source open occurs between the first source terminal S21 and the source of the first synchronous rectification transistor M21 occurs, the voltage of the first source terminal S21 is clamped by the forward voltages of the diodes D211 and D212, thereby preventing it from being unstable.

Similarly, the diodes D221 and D222 connected in parallel in reverse directions to each other are connected between the second source terminal S22 and the ground terminal GND. Accordingly, even when an abnormality in which a source open occurs between the second source terminal S22 and the source of the second synchronous rectification transistor M22 occurs, the voltage of the second source terminal S22 is clamped by the forward voltages of the diodes D211 and D212, thereby preventing it from being unstable.

The source open abnormality detection circuit 307 is a circuit for detecting a source open of the first source terminal S21 and the second source terminal S22, the details of which will be described later.

<<Basic Operation of the LLC Converter>>

Figure 3:
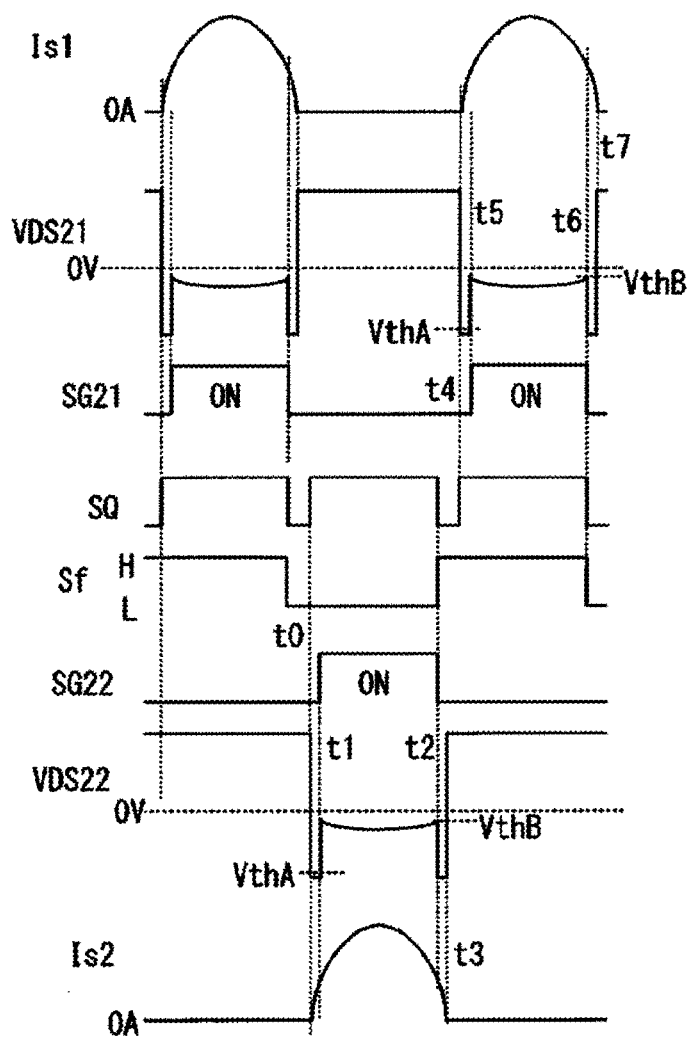
FIG. 3 is a timing chart illustrating a normal operation of the DC/DC converter according to the first embodiment of the present disclosure.

Next, an operation of the DC/DC converter 200A configured as described above will be described. Here, an operation in a state that a source open does not occur at both the first source terminal S21 and the second source terminal S22, and an abnormality detection signal SFL, which is output from the source open abnormality detection circuit 307 to be described later and input to one input terminal of the AND circuit 308, is High indicative of normal, and the Q output signal SQ is directly input to the input terminal 302D of the selector 302, will be described with reference to a timing chart illustrated in FIG. 3.

Before a timing t0, the frequency divider output signal Sf is Low, and the drain voltage VDS22 of the second drain terminal D22 as a detection target and the second driver Dr22 as an output destination of the Q output signal SQ are selected by the selector 302. In addition, the potential of the second source terminal S22 is selected as reference potential of the first threshold voltage VthA and the second threshold voltage VthB by the selector 309. Then, when the switching transistor M11 is turned on at the timing t0, the current Is2 starts to flow through the body diode BD2 of the second synchronous rectification transistor M22, and the first comparator 305 detects that the drain voltage VDS22 has dropped to a negative voltage, and asserts an ON signal Son. Accordingly, the Q output signal SQ is switched to High, the gate signal SG22 becomes an ON level by the second driver Dr22, and the second synchronous rectification transistor M22 is turned on at a timing t1. Thus, the current Is2 starts to flow from the source to the drain side of the second synchronous rectification transistor M22.

The current Is2 is a resonant current, and has a sinusoidal shape. Then, at a timing t2, the second comparator 306 detects that the current Is2 has become zero current based on the drain voltage VDS22, and asserts an OFF signal Soff. Accordingly, the Q output signal SQ is switched to Low, the gate signal SG22 becomes an OFF level, and the second synchronous rectification transistor M22 is turned off. At this time, the frequency divider output signal Sf is switched to High. Accordingly, the drain voltage VDS21 of the first drain terminal D21 as a detection target and the first driver Dr21 as an output destination of the Q output signal SQ are selected by the selector 302. In addition, the potential of the first source terminal S21 is selected as reference potential of the first threshold voltage VthA and the second threshold voltage VthB by the selector 309.

Furthermore, in the second synchronous rectification transistor M22 which is turned off, the current Is2 continues to flow through the body diode BD2, and the current Is2 does not flow at a timing t3.

Then, when the switching transistor M12 is turned on at a timing t4, the current Is1 starts to flow through the body diode BD1 of the first synchronous rectification transistor M21, and the first comparator 305 detects that the drain voltage VDS21 has dropped to a negative voltage, and asserts an ON signal Son. Accordingly, the Q output signal SQ is switched to High, the gate signal SG21 becomes an ON level by the first driver Dr21, and the first synchronous rectification transistor M21 is turned on at a timing t5. Thus, the current Is1 starts to flow from the source to the drain side of the first synchronous rectification transistor M21.

The current Is1 is a resonant current, and has a sinusoidal shape. Then, at a timing t6, the second comparator 306 detects that the current Is1 has become zero current based on the drain voltage VDS21, and assets an OFF signal Soff. Accordingly, the Q output signal SQ is switched to Low, the gate signal SG21 becomes an OFF level, and the first synchronous rectification transistor M1 is turned off. At this time, the frequency divider output signal Sf is switched to Low. Accordingly, the drain voltage VDS22 of the second drain terminal D22 as a detection target and the second driver Dr 22 as an output destination of the Q output signal SQ are selected by the selector 302. In addition, the potential of the second source terminal S22 is selected as reference potential of the first threshold voltage VthA and the second threshold voltage VthB by the selector 309.

Furthermore, in the first synchronous rectification transistor M21 which is turned off, the current Is1 continues to flow through the body diode BD1, and the current Is1 does not flow at a timing t7. Thereafter, the same repetitive operation is performed.

<<About the Source Open Abnormality Detection Circuit>>

Next, the source open abnormality detection circuit 307 will be described in detail. As illustrated in FIG. 1, the source open abnormality detection circuit 307 has a comparator 307A, a flip-flop 307B, and an inverter 307C.

The first source terminal S21 is connected to one non-inverting input terminal of the comparator 307A, and the second source terminal S22 is connected to the other non-inverting input terminal thereof. A predetermined threshold voltage Vth307 is applied to an inverting input terminal of the comparator 307A. An output terminal of the comparator 307A is connected to a clock terminal of the flip-flop 307B. A predetermined power source voltage is applied to a D input terminal of the flip-flop 307B. An input terminal of the inverter 307C is connected to a Q output terminal of the flip-flop 307B. An output terminal of the inverter 307C is connected to one input terminal of the AND circuit 308.

The comparator 307A compares a higher one of the voltage of the first source terminal S21 and the voltage of the second source terminal S22 with the threshold voltage Vth307, and when a state where it is higher than the threshold voltage Vth307 continues for a predetermined period of time (e.g., 10 µs) as the comparison result, a signal output to the clock terminal of the flip-flop 307B is switched to High. When a source open occurs at the first source terminal S21, there may be a case where a forward voltage (e.g., +0.6 V) of the diode D212 is generated at the first source terminal S21. When a source open occurs at the second source terminal S22, there may be a case where a forward voltage (e.g., +0.6 V) of the diode D222 is generated at the second source terminal S22. Therefore, if the threshold voltage Vth307 is set to a value lower than the forward voltage of the diodes D212 and D222, when a source open occurs in at least one of the first source terminal S21 and the second source terminal S22, the source open can be detected by the comparator 307A.

In addition, when the state continues for the predetermined period time as described above, the output of the High signal is to suppress false detection due to noise. When the signal output from the comparator 307A is switched to High, since the flip-flop 307B outputs a High signal from the Q output terminal to the inverter 307C, a Low signal indicative of an abnormality is input to one input terminal of the AND circuit 308. Accordingly, regardless of the level of the Q output signal SQ, the output of the AND circuit 308 becomes Low, the gate signals SG21 and SG22 become an OFF level, and the first synchronous rectification transistor M21 and the second synchronous rectification transistor M22 are turned off.

When a source open occurs in the first source terminal S21 and the second source terminal S22, there may be a case where the forward voltages of the diodes D212 and D222 are added to the second threshold voltage VthB and the voltage applied to the non-inverting input terminal of the second comparator 306 becomes a positive voltage. However, since the source open abnormality detection circuit 307 detects the source open and turns off the first synchronous rectification transistor M21 and the second synchronous rectification transistor M22, it is possible to avoid occurrence of a reverse flow in the currents Is1 and Is2.

That is, it is possible to avoid the destruction of the first synchronous rectification transistor M21 and the second synchronous rectification transistor M22 which may be generated because the first synchronous rectification transistor M21 and the second synchronous rectification transistor M22 cannot be turned off until the currents Is1 and Is2 flow backward from the sources to the drain sides of the first synchronous rectification transistor M21 and the second synchronous rectification transistor M22 and an avalanche breakdown occurs in the first synchronous rectification transistor M21 and the second synchronous rectification transistor M22 when they are turned off.

In addition, if it is configured that no diode is arranged between the first source terminal S21 and the second source terminal S22, and the ground terminal GND, when a source open occurs, the voltages of the first source terminal S21 and the second source terminal S22 become unstable, but when the voltages exceed the threshold voltage Vth307, the comparator 307A can detect it and the first synchronous rectification transistor M21 and the second synchronous rectification transistor M2s can be turned off.

<2. Second Embodiment>

Figure 4:
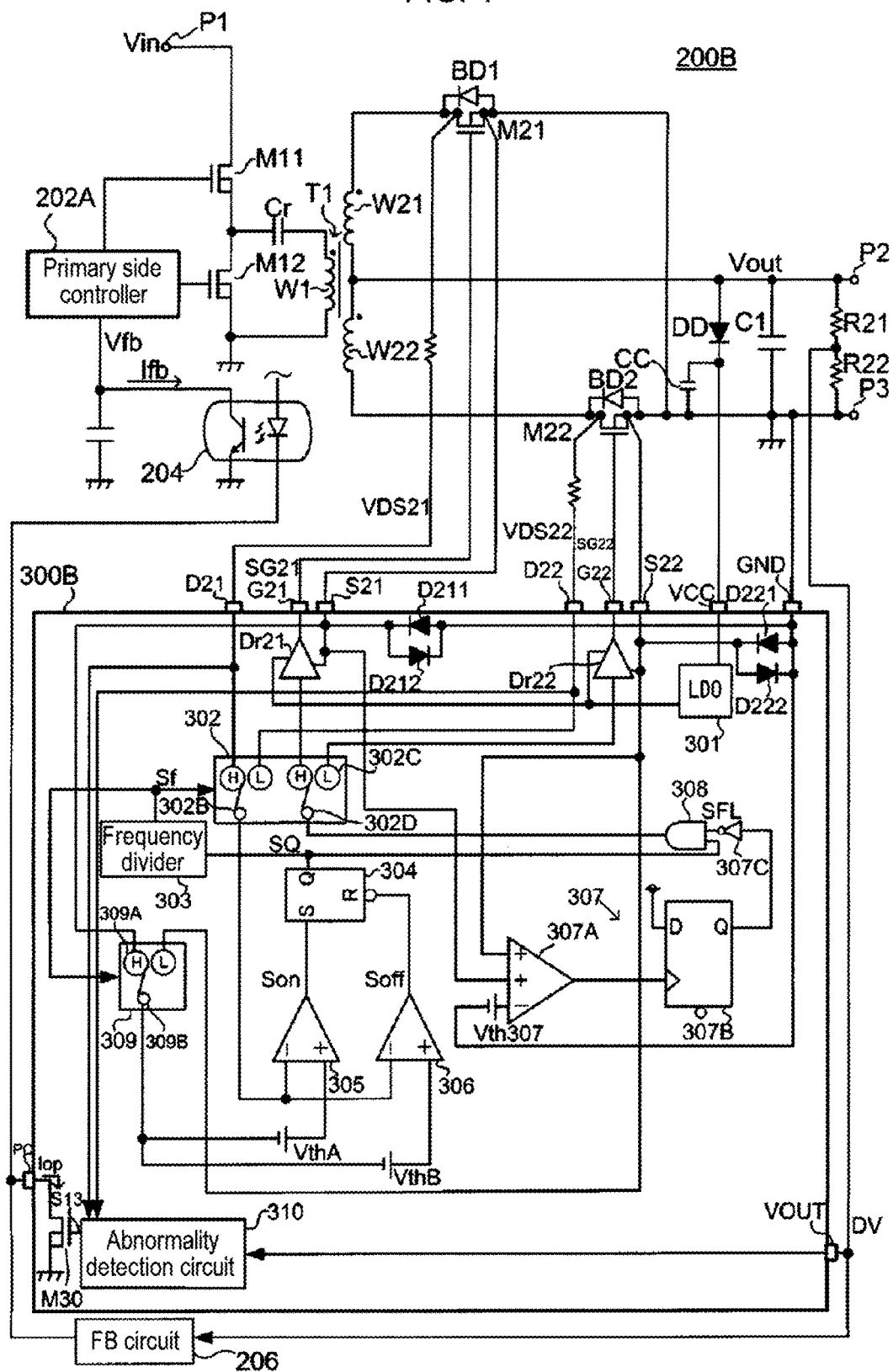
FIG. 4 is a circuit diagram of a DC/DC converter according to a second embodiment of the present disclosure.

FIG. 4 is a circuit diagram of a DC/DC converter 200B according to a second embodiment of the present disclosure. The DC/DC converter 200B has a synchronous rectification controller 300B having a configuration different from that of the first embodiment described above (FIG. 1). The synchronous rectification controller 300B has a function of detecting an abnormality of a drain open of the first drain terminal D21 and the second drain terminal D22, in addition to the function of detecting an abnormality of source open.

The synchronous rectification controller 300B is different from the synchronous rectification controller 300A (FIG. 1) in that it has an output voltage terminal VOUT and a photocoupler terminal PC as external terminals and also has a drain open abnormality detection circuit 310 and a transistor M30.

A divided voltage DV obtained by dividing an output voltage Vout by the resistors R21 and R22 is applied to the output voltage terminal VOUT. The divided voltage DV is input to the drain open abnormality detection circuit 310 via the output voltage terminal VOUT. The first drain terminal D21 and the second drain terminal D22 are connected to the drain open abnormality detection circuit 310.

A drain of the transistor M30 is connected to a cathode of a light emitting element of the photocoupler 204 via the photocoupler terminal PC. A source of the transistor M30 is connected to a ground application terminal. The drain open abnormality detection circuit 310 drives a gate of the transistor M30 by an abnormality detection signal S13.

When a periodic signal is not generated in at least one of the first drain terminal D21 and the second drain terminal D22 and the output voltage Vout is generated, the drain open abnormality detection circuit 310 asserts the abnormality detection signal S13.

For example, the drain open abnormality detection circuit 310 has a pulse detector. The pulse detector includes a detector for detecting edges of the drain voltages VDS21 and VDS22, and asserts a detection signal when an edge is not detected in at least one drain voltage for a predetermined period of time. In addition, for example, the drain open abnormality detection circuit 310 has a comparator, which compares the divided voltage VD with a predetermined threshold voltage, and when the divided voltage VD becomes higher, it asserts an output determination signal. Furthermore, for example, the drain open abnormality detection circuit 310 has a logic gate for asserting the abnormality detection signal S13 when both the detection signal and the output determination signal are asserted. The logic gate is, for example, an AND gate.

In this manner, the drain open abnormality detection circuit 310 detects a drain open of at least one of the first drain terminal D21 and the second drain terminal D22, and asserts the abnormality detection signal S13. At this time, a large current Top flows through the photocoupler 204 by driving the gate of the transistor M30, which increases a feedback current Ifb. Accordingly, since the potential of the feedback signal Vfb decreases, a primary side controller 202A stops switching of the switching transistors M11 and M12.

As described above, according to the DC/DC converter 200B of the present embodiment, the synchronous rectification controller 300B is provided with a function of detecting an abnormality of drain open, so that, when a drain open occurs, it is possible to avoid the DC/DC converter 200B from continuing to operate at high power in a diode rectification mode by the body diodes BD1 and BD2, and to improve the reliability.

<3. Third Embodiment>

Figure 5:
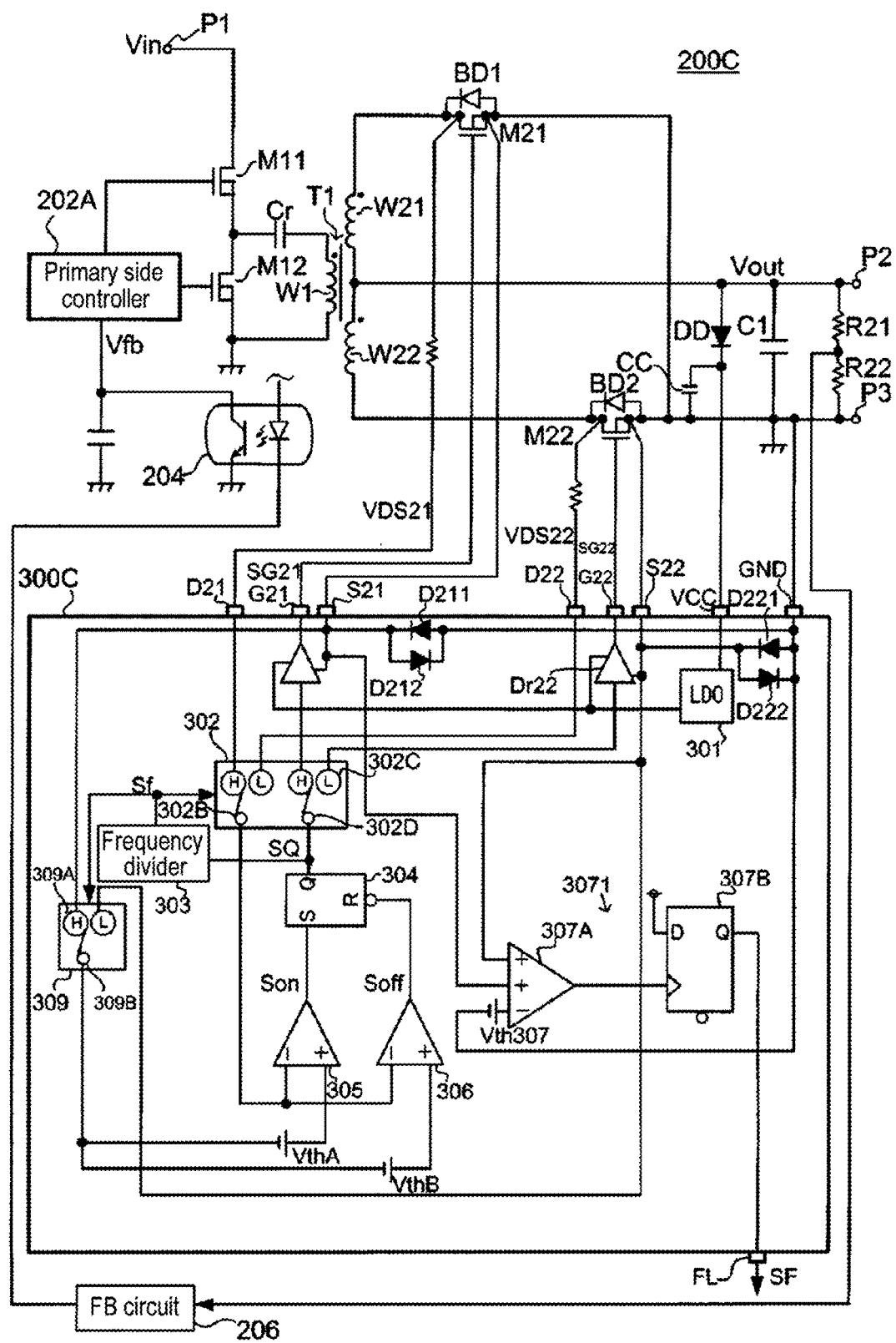
FIG. 5 is a circuit diagram of a DC/DC converter according to a third embodiment of the present disclosure.

FIG. 5 is a circuit diagram of a DC/DC converter 200C according to a third embodiment of the present disclosure. The DC/DC converter 200C has a synchronous rectification controller 300C having a configuration different from the first embodiment described above (FIG. 1).

A difference of the synchronous rectification controller 300C from the synchronous rectification controller 300A (FIG. 1) is a source open abnormality detection circuit 3071. Similar to the source open abnormality detection circuit 307, the source open abnormality detection circuit 3071 has a comparator 307A and a flip-flop 307B. The synchronous rectification controller 300C has an abnormality output terminal FL as an external terminal. A Q output terminal of the flip-flop 307B is connected to the abnormality output terminal FL.

The comparator 307A compares a higher one of a voltage of a first source terminal S21 and a voltage of a second source terminal S22 with a threshold voltage Vth307, and when a state where it is higher than the threshold voltage Vth307 continues for a predetermined period of time (e.g., 10 μs) as the comparison result, a signal output to a clock terminal of the flip-flop 307B is switched to High. Then, an abnormality detection signal SF output from the Q output terminal to the outside via the abnormality output terminal FL is asserted by the flip-flop 307B.

As described above, according to the present embodiment, the synchronous rectification controller 300C is provided with the source open abnormality detection circuit 3071, so that, when a source open occurs, it is possible to notify an abnormality state to the outside by the abnormality detection signal SF. Furthermore, in the present embodiment, since the Q output signal SQ output from the flip-flop 304 is directly input to the selector 302, even when a source open occurs, the operations of the first synchronous rectification transistor M21 and the second synchronous rectification transistor M22 will be continued.

<4. Fourth Embodiment>

Figure 6:
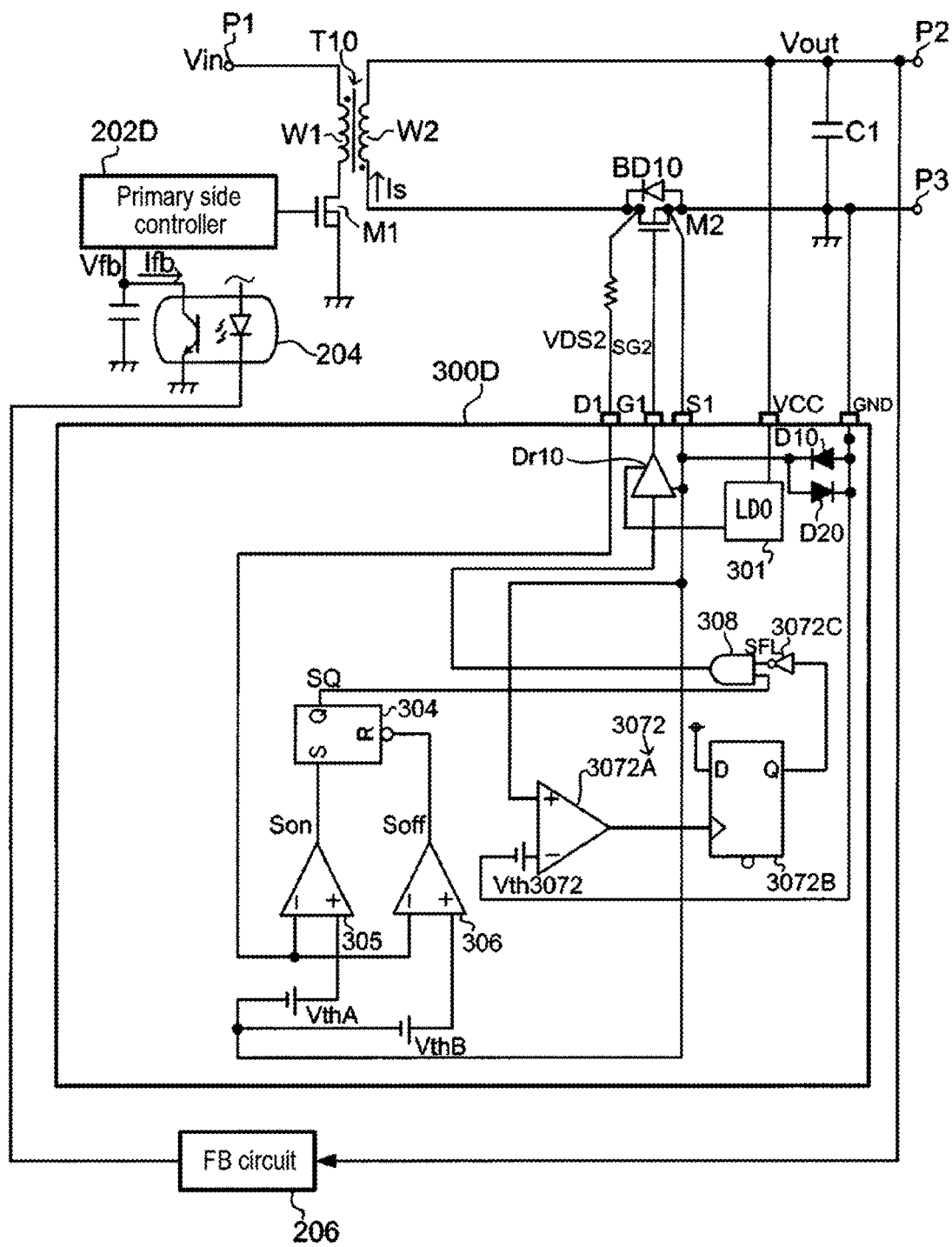
FIG. 6 is a circuit diagram of a DC/DC converter according to a fourth embodiment of the present disclosure.
Figure 7:
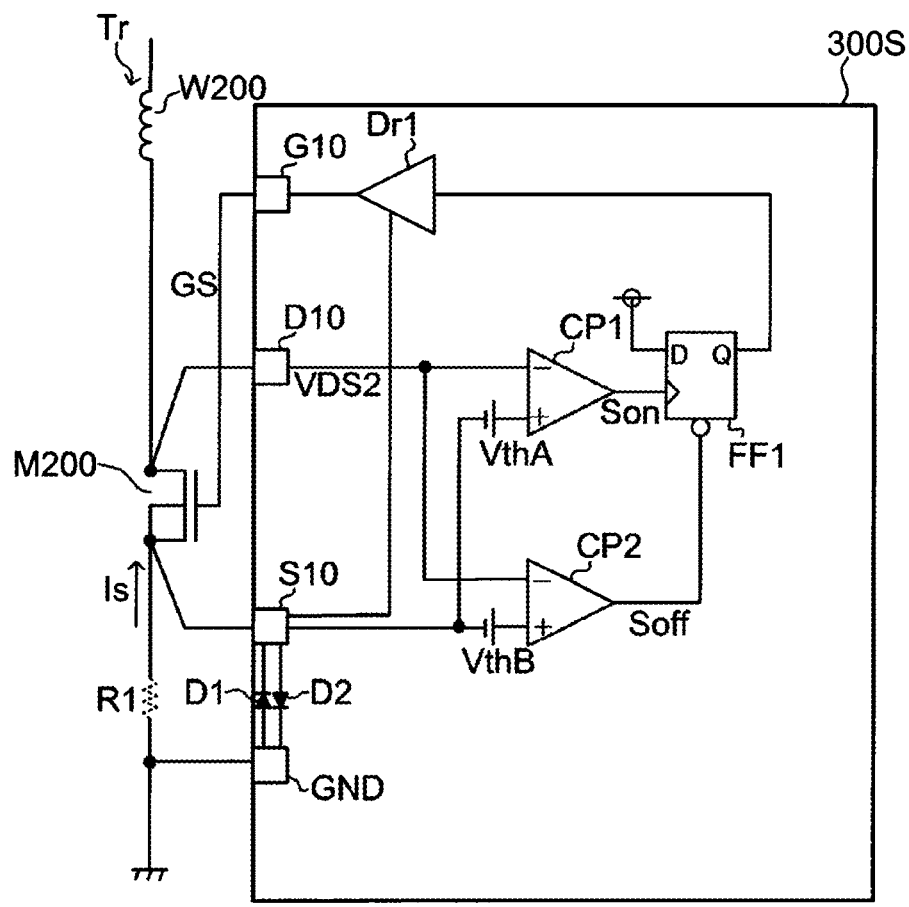
FIG. 7 is a circuit diagram illustrating one configuration example of a synchronous rectification controller.

The present disclosure may be applied not only to the LLC converter exemplified in the aforementioned embodiments but also to a flyback converter. FIG. 6 is a circuit diagram of a DC/DC converter 200D according to a fourth embodiment of the present disclosure. The DC/DC converter 200D is an isolated synchronous rectifying DC/DC converter as a flyback converter. The DC/DC converter 200D generates an output voltage Vout based on an input voltage Vin applied to an input terminal P1 and outputs it from an output terminal P2.

The DC/DC converter 200D includes a primary winding W1 included in a transformer T10, a switching transistor M1 and a primary side controller 202D, which are a primary side configuration, and a secondary winding W2 included in the transformer T10, an output capacitor C1, a synchronous rectification transistor M2 and a synchronous rectification controller 300D, which are a secondary side configuration.

The input terminal P1, to which a DC input voltage Vin is applied, is connected to one end of the primary winding W1. The other end of the primary winding W1 is connected to a drain of the switching transistor M1. A source of the switching transistor M1 is connected to a ground application terminal.

One end of the secondary winding W2 is connected to the output terminal P2. The other end of the secondary winding W2 is connected to a drain of the synchronous rectification transistor M2. A source of the synchronous rectification transistor M2 is connected to a ground terminal P3. The ground terminal P3 is connected to the ground application terminal. The output capacitor C1 is connected between the output terminal P1 and the ground terminal P3.

The DC/DC converter 200D also includes an FB circuit 206. The FB circuit 206 drives a light emitting element of a photocoupler 204 with a current corresponding to an error between the output voltage Vout and a target voltage. A feedback current Ifb corresponding to the error flows through a light receiving element of the photocoupler 204. A feedback signal Vfb according to the feedback current Ifb is generated at an FB pin of the primary side controller 202D, and the primary side controller 202D drives the switching transistor M1 based on the feedback signal Vfb.

The synchronous rectification controller 300D has an LDO regulator 301, a flip-flop 304, a first comparator 305, a second comparator 306, a source open abnormality detection circuit 3072, an AND circuit 308, a driver Dr10, and diodes D10 and D20, in one package. In addition, the synchronous rectification controller 300D has a drain terminal D1, a gate terminal G1, a source terminal S1, a power terminal VCC, and a ground terminal GND for establishing electrical connection with the outside.

The drain terminal D1, to which the drain of the synchronous rectification transistor M2 is connected, is connected to an inverting input terminal (−) of each of the first comparator 305 and the second comparator 306. A first threshold voltage VthA (e.g., −100 mV) is applied to a non-inverting input terminal (+) of the first comparator 305. A second threshold voltage VthB (e.g., −6 mV) is applied to a non-inverting input terminal of the second comparator 306. An output terminal of the first comparator 305 is connected to a set terminal of the flip-flop 304. An output terminal of the second comparator 306 is connected to a reset terminal of the flip-flop 304.

Similar to the first embodiment (FIG. 1) described above, the source open abnormality detection circuit 3072 also has a comparator 3072A, a flip-flop 3072B, and an inverter 3072C.

A source terminal S1 is connected to a non-inverting input terminal of the comparator 3072A. A predetermined threshold voltage Vth3072 is applied to an inverting input terminal of the comparator 3072A. An output terminal of the comparator 3072A is connected to a clock terminal of the flip-flop 3072B. A Q output terminal of the flip-flop 3072B is connected to an input terminal of the inverter 3072C. An output terminal of the inverter 3072C is connected to one input terminal of the AND circuit 308. A Q output terminal of the flip-flop 304 is connected to the other input terminal of the AND circuit 308.

An output terminal of the AND circuit 308 is connected to an input terminal of the driver Dr10. An output terminal of the driver Dr10 is connected to the gate terminal G1 to which the gate of the synchronous rectification transistor M2 is connected. A low potential side of the driver Dr10 is connected to the source terminal S1.

In addition, the first threshold voltage VthA and the second threshold voltage VthB are set based on the potential of the source terminal S1. This allows a drain voltage VDS2 of the drain terminal D1, which is not affected by parasitic impedance between the ground and the source of the synchronous rectification transistor M2, to be an object detected by the first comparator 305 and the second comparator 306.

Furthermore, the diodes D10 and D20, which are connected in parallel in opposite directions to each other, are arranged between the source terminal S1 and the ground terminal GND. Then, even when a source open of the source terminal S1 occurs, it is possible to prevent the voltage of the source terminal S1 from being unstable.

An operation of the DC/DC converter 200D having such a configuration in a state where the source open abnormality detection circuit 3072 does not detect an abnormality will be described. That is, the state is a state where an abnormality detection signal SFL output from the inverter 3072C is High indicative of a normal state, and the Q output signal SQ output from the Q output terminal of the flip-flop 304 is directly input to the driver Dr10 via the AND circuit 308.

When the switching transistor M1 is turned off, the drain voltage VDS2 becomes a negative voltage, which is detected by the first comparator 305, and an ON signal Son is asserted. Accordingly, the Q output signal SQ is switched to High, a gate signal SG2 output by the driver Dr10 through the gate terminal G1 becomes an ON level, and the synchronous rectification transistor M2 is turned on.

Thus, a current Is starts to flow from the source to the drain side of the synchronous rectification transistor M2. When the current Is decreases and reaches zero current, the second comparator 306 detects this based on the drain voltage VDS2 and asserts an OFF signal Soff. Then, the Q output signal SQ is switched to Low, the gate signal SG2 becomes an OFF level, and the synchronous rectification transistor M2 is turned off. Thereafter, the switching transistor M1 is turned on.

Next, an operation of the source open abnormality detection circuit 3072 will be described. When a source open occurs at the source terminal S1, there may be a case where a predetermined positive voltage is generated in the voltage of the source terminal S1 by a forward voltage of the diode D20. Accordingly, when the comparator 3072A detects that a state where the voltage of source terminal S1 exceeds the threshold voltage Vth3072 continues for a predetermined period of time, the signal output to the clock terminal of flip-flop 3072B is switched to High.

Then, the abnormality detection signal SFL, which is the output of the inverter 3072C, becomes Low by the Q output, which is output from the flip-flop 3072B. Accordingly, the output of the AND circuit 308 becomes Low regardless of the Q output signal SQ. Thus, the gate signal SG2 becomes an OFF level and the synchronous rectification transistor M2 is turned off.

When a source open occurs, there may be a case where the forward voltage of the diode D20 is added to the second threshold voltage VthB, and the voltage applied to the non-inverting input terminal of the second comparator 306 becomes a positive voltage. However, since the source open is detected by the source open abnormality detection circuit 3072 and the synchronous rectification transistor M2 is turned off, it is possible to avoid the occurrence of reverse flow in the current Is.

That is, it is possible to avoid the destruction of the synchronous rectification transistor M2 which may occur because the synchronous rectification transistor M2 cannot be turned off until the current Is flows in a reverse direction of a direction from the source to the drain side of the synchronous rectification transistor M2, and an avalanche breakdown occurs in the synchronous rectification transistor M2 when it is turned off.

In addition, if it is configured that no diode is arranged between the source terminal S1 and the ground terminal GND, the voltage of the source terminal S1 becomes unstable when a source open occurs, but when the voltage exceeds the threshold voltage Vth3072, the detection by the comparator 3072A becomes possible and the synchronous rectification transistor M2 can be turned off.

<5. Others>

While the embodiments of the present disclosure have been described above, the embodiments may be differently modified without departing from the spirit of the present disclosure.

The present disclosure can be applied to, for example, an LLC converter and the like.

According to the present disclosure in some embodiments, it is possible to detect an abnormality of source open of a source terminal by an isolated synchronous rectifying DC/DC converter of the present disclosure.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An isolated synchronous rectifying DC/DC converter, comprising:
a synchronous rectification transistor disposed on a secondary side of the DC/DC converter; and
a synchronous rectification controller configured to control driving of the synchronous rectification transistor,
wherein the synchronous rectification controller includes:
a drain terminal connected to a drain of the synchronous rectification transistor;
a source terminal connected to a source of the synchronous rectification transistor;
a comparator configured to compare a drain voltage of the drain terminal with a predetermined threshold voltage which is set based on a potential of the source terminal;
a first flip-flop to which an OFF signal output from the comparator is input;
a driver configured to output a gate signal to the synchronous rectification transistor based on an output signal of the first flip-flop; and
a first abnormality detection circuit including an abnormality detection comparator configured to compare a voltage of the source terminal with a detection threshold voltage, and configured to output a first abnormality detection signal based on an output of the abnormality detection comparator,
wherein the DC/DC converter is configured as an LLC converter having a first synchronous rectification transistor and a second synchronous rectification transistor,
wherein the synchronous rectification controller further includes:
a first drain terminal connected to a drain of the first synchronous rectification transistor;
a second drain terminal connected to a drain of the second synchronous rectification transistor;
a first source terminal connected to a source of the first synchronous rectification transistor;
a second source terminal connected to a source of the second synchronous rectification transistor;
a first gate terminal connected to a gate of the first synchronous rectification transistor;
a second gate terminal connected to a gate of the second synchronous rectification transistor;
a first driver configured to output a gate signal from the first gate terminal;
a second driver configured to output a gate signal from the second gate terminal;
a frequency divider to which the output signal of the first flip-flop is input; and
a selector configured to switch a path of the comparator between the first drain terminal and the second drain terminal based on an output of the frequency divider, and to switch a path of the first flip-flop between the first driver and the second driver,
wherein the predetermined threshold voltage is set based on potentials of the first source terminal and the second source terminal, and
wherein the abnormality detection comparator is configured to compare a higher one of a voltage of the first source terminal and a voltage of the second source terminal, with the detection threshold voltage.

2. The DC/DC converter of claim 1, wherein the synchronous rectification controller further includes an AND circuit configured to receive the output signal of the first flip-flop and the first abnormality detection signal to output an output signal to the driver.

3. The DC/DC converter of claim 2, wherein the first abnormality detection circuit further includes:
a second flip-flop to which the output of the abnormality detection comparator is input; and
an inverter configured to receive an output of the second flip-flop to output the first abnormality detection signal.

4. The DC/DC converter of claim 1, wherein the synchronous rectification controller further includes an abnormality output terminal as an external terminal, and
wherein the first abnormality detection circuit is configured to output the first abnormality detection signal via the abnormality output terminal based on the output of the abnormality detection comparator.

5. The DC/DC converter of claim 1, wherein the synchronous rectification controller further includes a ground terminal, and diodes connected in parallel in reverse directions to each other between the source terminal and the ground terminal.

6. The DC/DC converter of claim 1, wherein the synchronous rectification controller further includes a ground terminal, and
wherein the source terminal and the ground terminal are disconnected inside the synchronous rectification controller.

7. The DC/DC converter of claim 1, wherein the abnormality detection comparator is configured to assert an output signal when a state in which a voltage of the source terminal exceeds the detection threshold voltage continues for a predetermined period of time.

8. The DC/DC converter of claim 1, wherein the synchronous rectification controller further includes a second abnormality detection circuit configured to stop switching of a switching transistor arranged on a primary side of the DC/DC converter by a primary side controller by asserting a second abnormality detection signal when an open of the drain terminal is detected.

9. The DC/DC converter of claim 8, wherein the second abnormality detection circuit is configured to assert the second abnormality detection signal when a periodic signal is not generated at the drain terminal and an output voltage of the isolated synchronous rectifying DC/DC converter is generated.

10. The DC/DC converter of claim 8, further comprising:
a photocoupler; and
a feedback circuit configured to generate a feedback signal to the primary side controller by driving a light emitting element of the photocoupler based on an output voltage of the isolated synchronous rectifying DC/DC converter,
wherein the synchronous rectification controller further includes a transistor connected to the light emitting element and configured to be driven by the second abnormality detection signal.

11. The DC/DC converter of claim 1, wherein the synchronous rectification controller further includes an AND circuit configured to receive the output signal of the first flip-flop and the first abnormality detection signal to output an output signal to the selector.

* * * * *